US008499303B2

(12) United States Patent
Krishnakumar et al.

(10) Patent No.: US 8,499,303 B2
(45) Date of Patent: *Jul. 30, 2013

(54) DYNAMIC TECHNIQUES FOR OPTIMIZING SOFT REAL-TIME TASK PERFORMANCE IN VIRTUAL MACHINE

(75) Inventors: Anjur Sundaresan Krishnakumar, Princeton, NJ (US); Parameshwaran Krishnan, Basking Ridge, NJ (US); Min Lee, Atlanta, GA (US); Navjot Singh, Denville, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,520

(22) Filed: Apr. 19, 2012

(65) Prior Publication Data
US 2012/0216207 A1    Aug. 23, 2012

Related U.S. Application Data

(63) Continuation of application No. 12/849,921, filed on Aug. 4, 2010, now Pat. No. 8,166,485.

(60) Provisional application No. 61/232,542, filed on Aug. 10, 2009, provisional application No. 61/254,019, filed on Oct. 22, 2009.

(51) Int. Cl.
*G06F 9/46* (2006.01)
*G06F 15/173* (2006.01)

(52) U.S. Cl.
USPC ........... 718/104; 718/102; 718/105; 709/224; 709/226

(58) Field of Classification Search
USPC ................................ 718/1–105; 709/223–226
See application file for complete search history.

(56) References Cited

U.S. PATENT DOCUMENTS
5,392,430 A    2/1995    Chen et al.
5,701,482 A    12/1997   Harrison et al.
(Continued)

FOREIGN PATENT DOCUMENTS
EP    1536335 A2    6/2005

OTHER PUBLICATIONS

Hwanju Kim; Task-aware Virtual Machine Scheduling for I/O Performance; VEE'09, Mar. 11-13, 2009, Washington, DC, USA; pp. 101-110.*

(Continued)

*Primary Examiner* — Abdullah Al Kawsar
(74) *Attorney, Agent, or Firm* — Maldjian Law Group LLC; John P. Maldjian, Esq.; Alexander D. Walter, Esq.

(57) ABSTRACT

Methods to dynamically improve soft real-time task performance in virtualized computing environments under the management of an enhanced hypervisor comprising a credit scheduler. The enhanced hypervisor analyzes the on-going performance of the domains of interest and of the virtualized data-processing system. Based on the performance metrics disclosed herein, some of the governing parameters of the credit scheduler are adjusted. Adjustments are typically performed cyclically, wherein the performance metrics of an execution cycle are analyzed and adjustments may be applied in a later execution cycle. In alternative embodiments, some of the analysis and tuning functions are in a separate application that resides outside the hypervisor. The performance metrics disclosed herein include: a "total-time" metric; a "timeslice" metric; a number of "latency" metrics; and a "count" metric. In contrast to prior art, the present invention enables on-going monitoring of a virtualized data-processing system accompanied by dynamic adjustments based on objective metrics.

21 Claims, 8 Drawing Sheets

U.S. PATENT DOCUMENTS

| | | | |
|---|---|---|---|
| 6,658,449 | B1 | 12/2003 | Brenner et al. |
| 6,687,257 | B1 | 2/2004 | Balasubramanian |
| 6,779,182 | B1 | 8/2004 | Zolnowsky |
| 6,779,183 | B1 | 8/2004 | Chekuri et al. |
| 6,795,927 | B1 | 9/2004 | Altmejd et al. |
| 6,985,951 | B2 | 1/2006 | Kubala et al. |
| 7,035,984 | B2 | 4/2006 | Mastronarde et al. |
| 7,065,764 | B1 | 6/2006 | Prael et al. |
| 7,065,766 | B2 | 6/2006 | Brenner |
| 7,140,020 | B2 | 11/2006 | McCarthy et al. |
| 7,159,216 | B2 | 1/2007 | McDonald |
| 7,437,728 | B2 | 10/2008 | Stackhouse et al. |
| 7,673,113 | B2 | 3/2010 | Sugumar et al. |
| 7,743,140 | B2 | 6/2010 | Arndt et al. |
| 7,793,294 | B2 | 9/2010 | Haeri |
| 7,797,699 | B2 | 9/2010 | Kagi et al. |
| 7,904,673 | B2 | 3/2011 | Riska et al. |
| 7,904,691 | B2 | 3/2011 | Branda et al. |
| 7,937,705 | B1 | 5/2011 | Prael et al. |
| 7,979,863 | B2 | 7/2011 | Esfahany et al. |
| 8,146,079 | B2 * | 3/2012 | Gupta et al. ............... 718/1 |
| 8,286,174 | B1 * | 10/2012 | Schmidt et al. ............ 718/104 |
| 2003/0110203 | A1 | 6/2003 | Brenner et al. |
| 2003/0110204 | A1 | 6/2003 | Brenner et al. |
| 2003/0191794 | A1 | 10/2003 | Brenner et al. |
| 2003/0195920 | A1 | 10/2003 | Brenner et al. |
| 2003/0236815 | A1 | 12/2003 | Brenner et al. |
| 2004/0010788 | A1 * | 1/2004 | Cota-Robles et al. ........ 718/1 |
| 2004/0054999 | A1 | 3/2004 | Willen et al. |
| 2004/0148390 | A1 | 7/2004 | Cleary et al. |
| 2005/0028160 | A1 | 2/2005 | Cofer et al. |
| 2005/0091399 | A1 * | 4/2005 | Candan et al. ............. 709/238 |
| 2005/0262504 | A1 * | 11/2005 | Esfahany et al. ............ 718/1 |
| 2006/0036878 | A1 * | 2/2006 | Rothman et al. ........... 713/300 |
| 2006/0037021 | A1 | 2/2006 | Anand et al. |
| 2006/0195715 | A1 * | 8/2006 | Herington ................. 714/4 |
| 2006/0195845 | A1 * | 8/2006 | Rhine .................... 718/102 |
| 2007/0283176 | A1 | 12/2007 | Tobias et al. |
| 2008/0022284 | A1 * | 1/2008 | Cherkasova et al. ......... 718/104 |
| 2008/0022288 | A1 | 1/2008 | Bekooij |
| 2008/0059968 | A1 | 3/2008 | Cascaval et al. |
| 2008/0134185 | A1 | 6/2008 | Fedorova |
| 2008/0141048 | A1 | 6/2008 | Palmer et al. |
| 2008/0320122 | A1 * | 12/2008 | Houlihan et al. ........... 709/224 |
| 2009/0031317 | A1 | 1/2009 | Gopalan et al. |
| 2009/0077257 | A1 | 3/2009 | Savoor et al. |
| 2010/0094852 | A1 | 4/2010 | Gupta et al. |
| 2010/0095299 | A1 | 4/2010 | Gupta et al. |
| 2010/0100877 | A1 | 4/2010 | Greene et al. |
| 2010/0125851 | A1 | 5/2010 | Singh et al. |
| 2010/0131955 | A1 | 5/2010 | Brent et al. |
| 2010/0146503 | A1 * | 6/2010 | Tsai et al. ................ 718/1 |
| 2010/0306354 | A1 * | 12/2010 | DeHaan et al. ............ 709/222 |

OTHER PUBLICATIONS

Ackaouy, Emmanuel, "[Xen-devel] New CPU Scheduler w/ SMP load balancer," ists.xensource.com/archives/html/xen-devel/2006-05/msg01315.html, May 26, 2006, Publisher: xensource.com, 2 pages.

Apparao et al., "Characterization & Analysis of a Server Consolidation Benchmark," Virtual Execution Environments Conference 2008 Seattle, Washington, Mar. 5-7, 2008, Publisher: Association for Computing Machinery, 9 pages.

Apparao et al., "Characterization of network processing overheads in Xen," Second Annual Workshop on Virtualization Technology in Distributed Computing (VTDC 2006), 2006, Publisher: IEEE, 8 pages.

Barham et al., "Xen and the Art of Virtualization," Symposium on Operating System Principles 2003 Bolton Landing, New York, cl.cam.ac.uk/research/srg/netos/papers/2003-xensosp.pdf, Oct. 19-22, 2003; Publisher: Association for Computing Machinery, Published in: US, 14 pages.

"Bin packing problem," wikipedia.org/wiki/Bin_packing_problem, May 31, 2010, Publisher: Wikimedia Foundation, Inc., 2 pages.

Calandrino et al., "Soft Real-Time Scheduling on Performance Asymmetric Multicore Platforms," Apr. 3-6, 2007, 10 pages.

"Credit-Based CPU Scheduler," wiki.xensource.com/xenwiki/CreditScheduler, Xen Wiki , Apr. 27, 2010, Nov. 15, 2007, Publisher: Citrix Systems, Inc., 2 pages.

Govindan et al., "Xen and Co.: Communication-aware CPU Scheduling for Consolidated Xen-baed Hosting Platforms," Virtual Execution Environments 2007 San Diego, California, Jun. 13-15, 2007, Publisher: Association for Computing Machinery, 11 pages.

Gupta et al., "XenMon: QoS Monitoring and Performance Profiling Tool," Technical Report HPL-2005-187, Oct. 18, 2005, Publisher: Hewlett-Packard Development Company, LP, 13 pages.

"How Does Xen Work," .xen.org/files/Marketing/HowDoesXenWork.pdf, Dec. 2009, 10 pages.

"How to Enable Xentrace Logging and Format With Xentrace_Format," Citrix Knowledge Center CTX121583 support.citrix.com/article/CTX121583, Publisher: Citrix Systems, Inc., 8 pages.

Kim et al. "Guest-Aware Priority-Based Virtual Machine Scheduling for Highly Consolidated Server," 2008, 10 pages.

Kim et al., "Task-aware Virtual Machine Scheduling for I/O Performance," "Virtual Execution Environments 2009 Washington, DC", Mar. 11-13, 2009, Publisher: Association for Computing Machinery, 10 pages.

Lee et al., "Supporting Soft Real-Time Tasks in the Xen Hypervisor," "VEEE '10: Proceedings of the 6th International Conference on Virtual Execution Environments, 2010", Mar. 17-19, 2010, 18 pages.

Liao et al., "Software Techniques to Improve Virtualized I/O Performance on Multi-Core Systems," ACM/IEEE Symposium on Architectures for Networking and Communications Systems (ANCS) 2008 San Jose, California, Nov. 6-7, 2008, Publisher: Association for Computing Machinery, 10 pages.

Liu et al., "High Performance VMM-Bypass I/O in Virtual Machines," Annual Tech '06: 2006 USENIX Annual Technical Conference usenix.org/events/usenix06/tech/full_papers/liu/liu.pdf, Publisher: USENIX Assocation, 14 pages.

Malkevitch, Joseph, "Bin Packing and Machine Scheduling," Feature col.—Monthly Essays on Mathematical Topics ams.org/samplingsfeature-column/fcarc-packings1 Apr. 27, 2010, Publisher: American Mathematical Society, 2 pages.

Mathai, Jacob, "Xen Wlki—Xen Scheduling," wiki.xensource.com/xenwiki/Scheduling[Nov. 23, 2009 11:44:24 AM], Jun. 9, 2007, 3 pages.

Menon et al., "Diagnosing Performance Overheads in the Xen Virtual Machine Environment," .hpl.hp.com/techreports/2005/HPL-2005-80.pdf, 2005, Publisher: Association for Computing Machinery, 12 pages.

Menon et al., "Optimizing Network Virtualization in Xen," (Alternative Source) infoscience.epfl.ch/getfile.py?docid=8044&name=usenix06&format=pdf&version=1, 14 pages.

Menon et al., "Optimizing Network Virtualization in Xen," usenix.org/events/usenix06/tech/menon/menon_html/paper.html, 20 pages.

"Multiprocessor Scheduling," Wikipedia, en.wikipedia.org/wiki/Multiprocessor_scheduling Apr. 27, 2010, Oct. 29, 2009, Publisher: Wikimedia Foundation, Inc., 1 page.

Nishiguchi, Naoki, "Evaluation and consideration of credit scheduler for client virtualization," .xen.org/files/xensummit_tokyo/15/NaokiNishiguchi-en.pdf Other info at http://www.xen.org/xenxum-mitixensummit_fall_2008. html, 2008, Publisher: Fujitsu Laboratories Limited, 55 pages.

Oi et al., "Performance Analysis of Large Receive Offload in a Xen Virtualized System," 2009 International Conference on Computer Engineering and Technology, 2009, Publisher: IEEE Xplore, 6 pages.

Ongaro et al., "Scheduling I/O in Virtual Machine Monitors," Virtual Execution Environments 2008 Seattle, Washington, Mar. 5-7, 2008, Publisher: Association for Computing Machinery, 10 pages.

"P.862 Perceptual evaluation of speech quality (PESQ): An objective method for end-to-end speech quality assessment of," 2008, Publisher: International Telecommunication Union (ITU), 1 page.

Patnaik et al., "Performance Implications of Hosting Enterprise Telephony Application on Virtualized Multi-Core Platforms," IPTCOMM 2009 Conference Georgia Tech Atlanta, Georgia, Jul. 7-8, 2009, Publisher: Association for Computing Machinery, Published in: US, 11 pages.

Raj et al., "High Performance and Scalable I/O Virtualization via Self-Virtualized Devices," IEEE International Symposium on High Performance Distributed Computing (UPDC) 2007 Monterrey, California, Jun. 25-29, 2007, Publisher: Association for Computing Machinery, 10 pages.

Santos et al., "Bridging the Gap between Software and Hardware Techniques for I/O Virtualization," 2008 USENIX Annual Technical Conference usenix.org/events/usenix08/tech/full_papers/santos/santos.- pdf, Publisher: USENIX Association, 14 pages.

"Series P: Telephone Transmission Quality, Telephone Installations, Local Line Networks," ITU-T Recommendation p. 862, Feb. 2001, 30 pages.

Tannenbatum et al. "Condor—A Distributed Job Scheduler," ACM, 2001, 45 pages.

Thibault, Samuel, "Stub Domains—A Step Towards Dom0 Disaggregation," xen.org/files/xensummitboston08/SamThibault_XenSummit.pdf, Publisher: Xen Summit, May 5, 2009, 35 pages.

Willmann et al., "Concurrent Direct Network Access for Virtual Machine Monitors," HPCA 2007, 12 pages.

"Xen Hypervisor—Leading Open Source Hypervisor for Servers," xen.org/products/xenhyp.html Apr. 27, 2010, Publisher: Citrix Systems, Inc., 2 pages.

"Xen Summit Asia 2008," xen.org/xensummit/xensummit_fall_2008.html[Nov. 23, 2009 11:23:18 AM], Nov. 20-21, 2008, Publisher: xen.org, 2 pages.

Yoo et al., "A Step to Support Real-time in Virtual Machine," os.korea.ac.kr/publication_papers/inter_confer/shyoo_CCNC_2009.pdf, Publisher: IEEE Xplore, 7 pages.

Zhang et al., "Optimizing Xen VMM Based on Intel Virtualization Technology," 2008 International Conference on Internet Computing in Science and Engineering, 2008, Publisher IEEE Xplore, 8 pages.

* cited by examiner

DYNAMIC TECHNIQUES FOR OPTIMIZING SOFT REAL-TIME TASK PERFORMANCE IN VIRTUAL MACHINE

CROSS-REFERENCE TO RELATED APPLICATIONS

The present application is a continuation of U.S. patent application Ser. No. 12/849,921 filed Aug. 4, 2010, now U.S. Pat. No. 8,166,485, entitled "Dynamic Techniques for Optimizing Real-Time Task Performance in Virtual Machines," which claims the benefit of U.S. Provisional Patent Application No. 61/232,542, filed Aug. 10, 2009, entitled "Supporting Soft Real-Time Virtual Machines." The concepts, but not necessarily the nomenclature, of this provisional application are hereby incorporated by reference.

Furthermore, this application claims the benefit of U.S. provisional application No. 61/254,019, filed Oct. 22, 2009, entitled "Supporting Soft Real-Time Virtual Machines." The concepts, but not necessarily the nomenclature, of this provisional application are hereby incorporated by reference.

If there are any contradictions or inconsistencies between this application and one or more of the cases that have been incorporated by reference, the claims in the present case should be interpreted to be consistent with the language in this case.

U.S. patent application Ser. No. 12/686,719, filed Jan. 13, 2010, now U.S. Pat. No. 8,245,234, entitled "Credit Scheduler for Ordering the Execution of Tasks," is related to the present application.

U.S. patent application Ser. No. 12/768,458, filed Apr. 27, 2010, now U.S. Pat. No. 8,161,491, entitled "Soft Real-Time Load Balancer," is related to the present application.

BACKGROUND

1. Field of the Invention

The present invention relates to data processing systems in general, and, more particularly, to credit schedulers for ordering the execution of tasks on a processor.

2. Description of the Related Art

In a data-processing system, when two or more operating systems operate on one piece of hardware, the tasks associated with each operating system contend for the hardware that is available. Without something to mediate their access, one operating system's tasks could monopolize or over-use the hardware to the detriment of the other operating system's tasks. When the hardware comprises more than one processor that is available to execute the various tasks, one processor can become over-utilized while another remains under-used. Therefore, a program that sits between the operating systems and the hardware acts as a mediator. This program is commonly known as a "hypervisor."

One of the jobs performed by the hypervisor is to choose a processor that is to execute one or more tasks. Another job of the hypervisor is to schedule the order of execution of tasks. Another job of the hypervisor is to allocate the share of time that the data-processing system is to spend executing certain types of tasks relative to other types. These are not easy jobs. Some tasks are time-sensitive (e.g., tasks associated with input or output, speech processing, video processing, transmission or reception of signals, etc.) and some tasks are non-time-sensitive or are less time sensitive. Some tasks require relatively long times on a processor and other tasks requires less time. Whatever the mix, the respective operating systems are always presenting to the hypervisor tasks to be executed. If the hypervisor does not properly balance and allocate resources, the performance of the entire system can degrade. For voice- and media-related applications, the degradation is evidenced by poor quality of voice or video.

A need therefore exists for a hypervisor that can properly manage a complex mix of contending tasks, including time-sensitive and non-time-sensitive tasks.

SUMMARY

The present invention enables the scheduling and execution of tasks without some of the costs and disadvantages associated with hypervisors in the prior art. The present disclosure describes techniques that dynamically improve soft real-time task performance in virtualized computing environments that are under the management of an enhanced hypervisor.

Tasks generally known in the art as "soft real-time" tasks are time-sensitive tasks that have somewhat flexible (or "soft") deadlines. Tasks that perform general computing typically are non-time-sensitive tasks. Soft real-time tasks are often associated with media servers and IP PBX applications, or with other voice processing or media call processing applications. Some of the illustrative embodiments of the present invention serve the special needs of soft real-time tasks, and therefore, whether a task is time-sensitive or non-time-sensitive, is material to the operation of some of the illustrative embodiments. However, the present invention is not so limited, and the techniques and systems disclosed herein can be applied to other types of tasks that are not necessarily time-sensitive, but which have special performance needs that prior art hypervisors do not address.

For purposes of this specification, a "domain" is defined as software that is (i) an operating system or (ii) an application using the operating system, and that comprises tasks, each of which is to be executed by a processor in the data-processing system that is under the management of a hypervisor.

The present disclosure describes techniques that measure and monitor the performance of one or more domains of interest running in a virtualized data-processing system. The disclosure introduces a plurality of performance metrics that characterize the domain(s) of interest, which typically are time-sensitive domains. Based on the performance metrics, an enhanced hypervisor generates adjusted parameters to improve the performance of the domain(s) of interest.

In the aggregate, the enhanced hypervisor receives tasks to be executed and analyzes them. The enhanced hypervisor in the illustrative embodiments comprises a credit scheduler. The credit scheduler is the system component that actually queues each task and gives it a priority level that affects when the task will be executed on a processor. The priority and queue placement is governed by parameters in the credit scheduler. The enhanced hypervisor analyzes the on-going performance of the domains of interest and of the virtualized data-processing system that runs the domains. Based on the performance metrics that are disclosed herein, some of the governing parameters of the credit scheduler are adjusted. Adjustments are typically performed cyclically, wherein the performance metrics of an execution cycle are analyzed and, if need be, adjustments are applied in a later execution cycle, although a different time interval can be used.

In alternative embodiments, some of the analysis and tuning functions are implemented in a separate application that resides outside the hypervisor and communicates with the hypervisor through appropriate interfaces. Although the illustrative embodiments operate on a multi-processor system, the invention is not so limited, and some of the disclosed techniques apply to a single-processor system.

Several performance metrics are disclosed herein, including:

- A "total-time" metric that is the total amount of time, during an execution cycle, that was spent executing all tasks of a given domain and priority level.
- A "timeslice" metric that is the average amount of time, during an execution cycle, that was spent executing a task of a given domain and priority level.
- A "total-latency" metric that is the total amount of time, during an execution cycle, that a task of a given domain and priority level waited in a queue before being executed on a processor.
- A "credit-latency" metric that is the average amount of time, during an execution cycle, that a task of a given domain and priority level waited in a queue before being allocated more credit.
- An "average-latency" metric that is the average amount of time, during an execution cycle, that a task of a given domain and priority level waited in a queue before being executed on a processor.
- A "count" metric that is the number of times, during an execution cycle, that a task of a given domain and priority level entered a queue.

In alternative embodiments, the disclosed metrics are based on a time interval that does not equate to an execution cycle, such as a plurality of execution cycles, or some other time interval.

In some illustrative embodiments comprising voice-related applications, one of the metrics of performance quality is the voice quality as measured by the perceptual evaluation of speech quality ("PESQ") standard measure specified by ITU-T Recommendation P.862. In general, if the voice quality of the voice-related domains is not acceptable, the performance of the data-processing system requires adjustment. Adjustments can be based on benchmarks other than PESQ.

The disclosed techniques evaluate the above-mentioned metrics and, if necessary, calculate adjustments. Based on the calculations, the scheduler then adjusts its parameters going forward. In contrast to prior art systems, the present invention enables on-going monitoring of a virtualized data-processing system accompanied by dynamic adjustments based on objective metrics.

Some illustrative embodiments comprise: A method comprising: receiving by a hypervisor in a data-processing system a first metric that is associated with a first domain, wherein: (i) the data-processing system comprises a first processor and a second processor, (ii) the first domain comprises a first plurality of tasks that were executed on the data-processing system, and (iii) the first metric is based on the amount of time, during an earlier time interval, that was spent executing tasks of the first domain that had an over priority; when the value of the first metric is above a first threshold, increasing an amount of time to be spent in a later time interval to execute tasks of the first domain that have an over priority; and executing by the data-processing system in the later time interval the tasks of the first domain, based on the increased amount of time.

DETAILED DESCRIPTION

Figure 1:
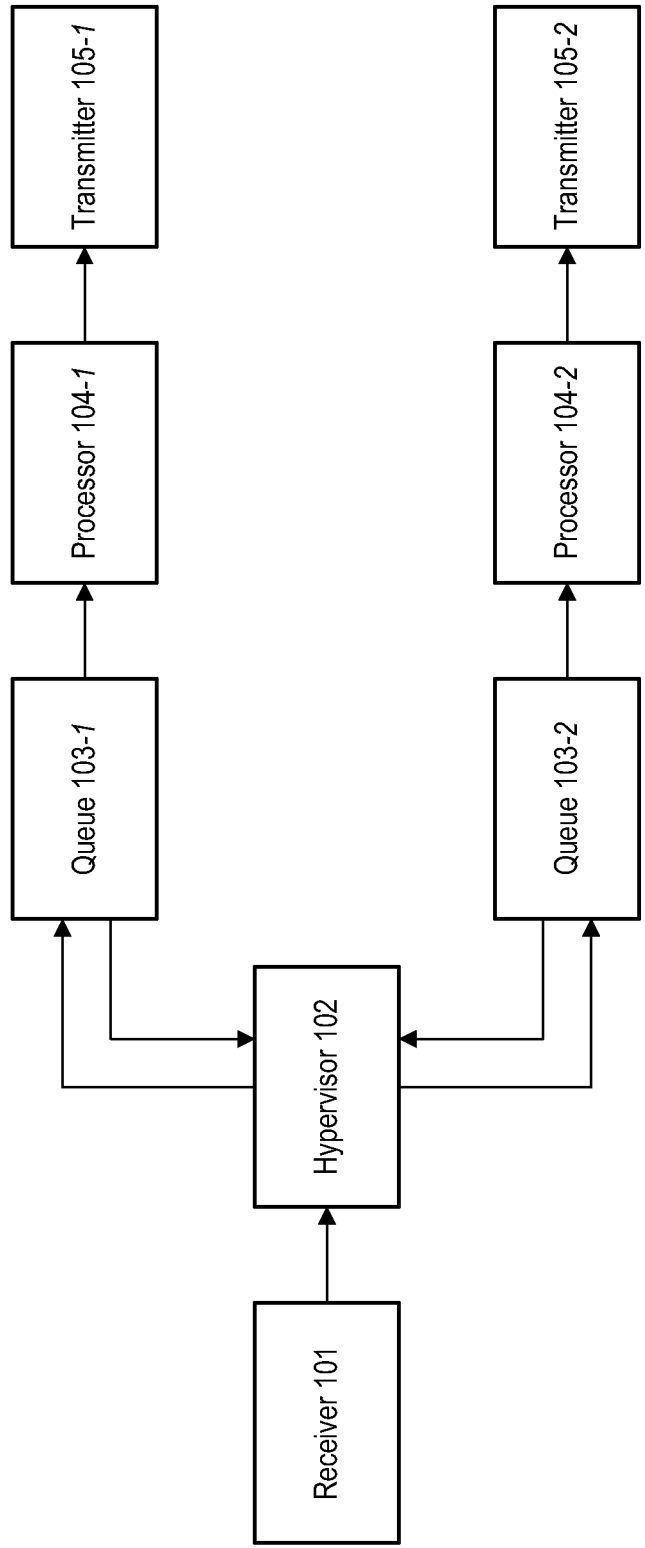
FIG. 1 depicts a schematic diagram of a portion of data-processing system 100 in accordance with an illustrative embodiment of the present invention.

For the purposes of this specification, the term "processor" is defined as a tangible computing resource that is capable of executing a task. In the present disclosure, data-processing system 100 comprises two processors. It will be clear to those skilled in the art that alternative names for a processor include, but are not limited to, "computer," "core," "computing core," "processing core," "central processing unit," "CPU," "computing resource," or "processing resource."

For the purposes of this specification, the term "task" is defined as at least one operation performed by a processor. A task is any entity that can be scheduled on a processor, e.g., a process or a "virtual CPU" ("VCPU").

In some illustrative embodiments, a domain is sometimes referred to as a "virtual machine" ("VM"), and can comprise one or more VCPUs. In some alternative embodiments, a VM comprises a plurality of domains.

For purposes of this specification, a "time-sensitive" task is a task that has an execution deadline. A task that is generally known in the art as a "soft real-time" task is a time-sensitive task with a somewhat flexible (or "soft") deadline. Some tasks are time-sensitive in accordance with the function they perform in data-processing system 100. A domain that is designated as time-sensitive comprises tasks that are all, or in substantial part, time-sensitive. In some illustrative embodiments, when a domain is designated as time-sensitive, the tasks that it comprises are treated as time-sensitive tasks.

For purposes of this specification, a "non-time-sensitive" task is a task that lacks an execution deadline or has a generous deadline that is well beyond the flexible deadline of a time-sensitive task. Tasks that perform general computing typically are non-time-sensitive tasks. A domain that is designated as non-time-sensitive comprises tasks that are all, or in substantial part, non-time-sensitive. In some illustrative embodiments, the tasks of a domain that is designated as non-time-sensitive are treated as non-time-sensitive tasks.

For purposes of this specification, a "priority" attribute of a task governs at least in part (i) where the task is placed within a queue to await execution, and (ii) how soon after being queued the task will be executed by a processor. Priority is described more below and in regards to FIG. 3.

As noted, the present invention enables monitoring a virtualized data-processing system and dynamically applying adjustments to compensate for inadequate performance. In some embodiments, the particular concern is with the performance of time-sensitive tasks and domains. For example, one concern is whether time-sensitive tasks are being starved for processing resources, which may be evidenced by too much time spent in the over-priority region of a queue. A second concern is whether time-sensitive tasks are too often pre-empted from a processor, even when they have plenty of allocated credits, which may be evidenced by too much time or too many visits to the under-priority region of a queue. A third concern is whether time-sensitive tasks with high input/ output needs would benefit from moving to the boost-priority region of a queue to speed up their execution. The system, techniques, and metrics described herein enable the monitoring and accompanying adjustments to improve the performance of time-sensitive tasks and domains in a system according to the present invention.

FIG. 1 depicts a schematic diagram of a portion of data-processing system 100 in accordance with an illustrative embodiment of the present invention.

Data-processing system 100 is a hardware and software system that comprises in salient part: receiver 101; hypervisor 102; queue 103-1; processor 104-1; transmitter 105-1; queue 103-2; processor 104-2; and transmitter 105-2. It will be clear to those having ordinary skill in the art, after reading the present disclosure, how to make and use alternative embodiments in which some of the components of data-processing system 100 are instantiated in software or in a combination of software and hardware, and wherein any components instantiated in software themselves are executed on a processor in data-processing system 100. It will be clear to those having ordinary skill in the art, after reading the present disclosure, that any disclosure herein in respect to a component n applies equally to other components of the same kind.

Although FIG. 1 depicts one receiver 101, it will be clear to those having ordinary skill in the art, after reading the present disclosure, how to make and use alternative embodiments of the present invention that comprise any number of receivers, e.g., two receivers, three receivers, etc. For example, a receiver might be dedicated to each queue.

Although FIG. 1 depicts one hypervisor 102, it will be clear to those having ordinary skill in the art, after reading the present disclosure, how to make and use alternative embodiments of the present invention that comprise any number of hypervisors, e.g., two hypervisors, three hypervisors, etc.

Although FIG. 1 depicts two queues 103-1 and 103-2, it will be clear to those having ordinary skill in the art, after reading the present disclosure, how to make and use alternative embodiments of the present invention that comprise any number of queues, e.g., one queue, three queues, four queues, etc.

Although FIG. 1 depicts two processors 104-1 and 104-2, meaning that data-processing system 100 is instantiated as a multi-processor system, it will be clear to those having ordinary skill in the art, after reading the present disclosure, how to make and use alternative embodiments of the present invention that comprise any number of processors, e.g., one processor, three processors, four processors, etc. It will be further clear to those having ordinary skill in the art, after reading the present disclosure, how to make and use alternative embodiments of the present invention in which a multi-core processor platform comprises some or all of the processors in data-processing system 100. It will be further clear to those having ordinary skill in the art, after reading the present disclosure, how to make and use alternative embodiments of the present invention in which a processor in data-processing system 100 comprises multiple cores.

Although FIG. 1 depicts two transmitters 105-1 and 105-2, it will be clear to those having ordinary skill in the art, after reading the present disclosure, how to make and use alternative embodiments of the present invention that comprise any number of transmitters, e.g., one transmitter, three transmitters, etc.

It will be clear to those having ordinary skill in the art, after reading the present disclosure, how to make and use alternative embodiments of the present invention in which the components are differently connected than the depiction of FIG. 1. For example, each queue might receive tasks from a receiver before task scheduling occurs at hypervisor 102.

Although FIG. 1 depicts the components of data-processing system 100 as being separate from one another, it will be clear to those having ordinary skill in the art, after reading the present disclosure, how to make and use alternative embodiments of the present invention in which a single physical device comprises one or more of these components. For example, a multi-core processor platform could comprise: some or all of the processors; some or all of the queues; some or all of the receivers; and some or all of the transmitters in data-processing system 100. For example, hypervisor 102 could comprise queues 103-1 and 103-2. It will be further clear to those having ordinary skill in the art, after reading the present disclosure, how to make and use alternative embodiments of the present invention in which multiple physical devices are logically associated to comprise one or more of these components. For example, multiple processors that are distinct physical components could be logically associated in a virtualized computing environment. Likewise, a virtualized computing environment could comprise a combination of distinct and combined components in accordance with the present invention, such as a single core processor and a multi-core processor.

Although FIG. 1 depicts certain ratios of one type of component to another type of component, it will be clear to those having ordinary skill in the art, after reading the present disclosure, how to make and use alternative embodiments of the present invention in which the ratios differ. For example, a single queue could be logically subdivided to serve more than one processor. For example, a single transmitter might transmit output from more than one processor.

Receiver 101 is hardware that receives a temporal succession of tasks to be executed by data-processing system 100 and presents those tasks to hypervisor 102. For purposes of the present disclosure, each task is identified by $T_k$, wherein k is an integer that represents the relative order of arrival of the task at receiver 101 with respect to other tasks. For example, task $T_k$ arrived at receiver 101 immediately before task $T_{k+1}$, wherein k is an integer. It will be clear to those skilled in the art, after reading this disclosure, how to make and use receiver 101.

Hypervisor 102 is software that is capable of performing the functionality described in this disclosure and in the accompanying figures. It will be clear to those having ordinary skill in the art, after reading the present disclosure, that a software-based scheduler 102 is itself executed by a processor, but not necessarily by processor 104-1 or processor 104-2. It will be further clear to those having ordinary skill in the art, after reading the present disclosure, how to make and use alternative embodiments of the present invention in which scheduler 102 is exclusively hardware or a combination of hardware and software.

Hypervisor 102 virtualizes the tangible physical resources of data-processing system 100—such as processors, memory and direct-access storage devices—so that domains can smoothly run on data-processing system 100. Hypervisor 102 enables multiple domains to run concurrently on data-processing system 100 by presenting the guest domains with a virtual platform while the hypervisor monitors the performance of the domains, allocates tasks to the available processors, and takes other appropriate actions. A hypervisor is also known in the art as a "virtual machine monitor" or "VMM."

Figure 2:
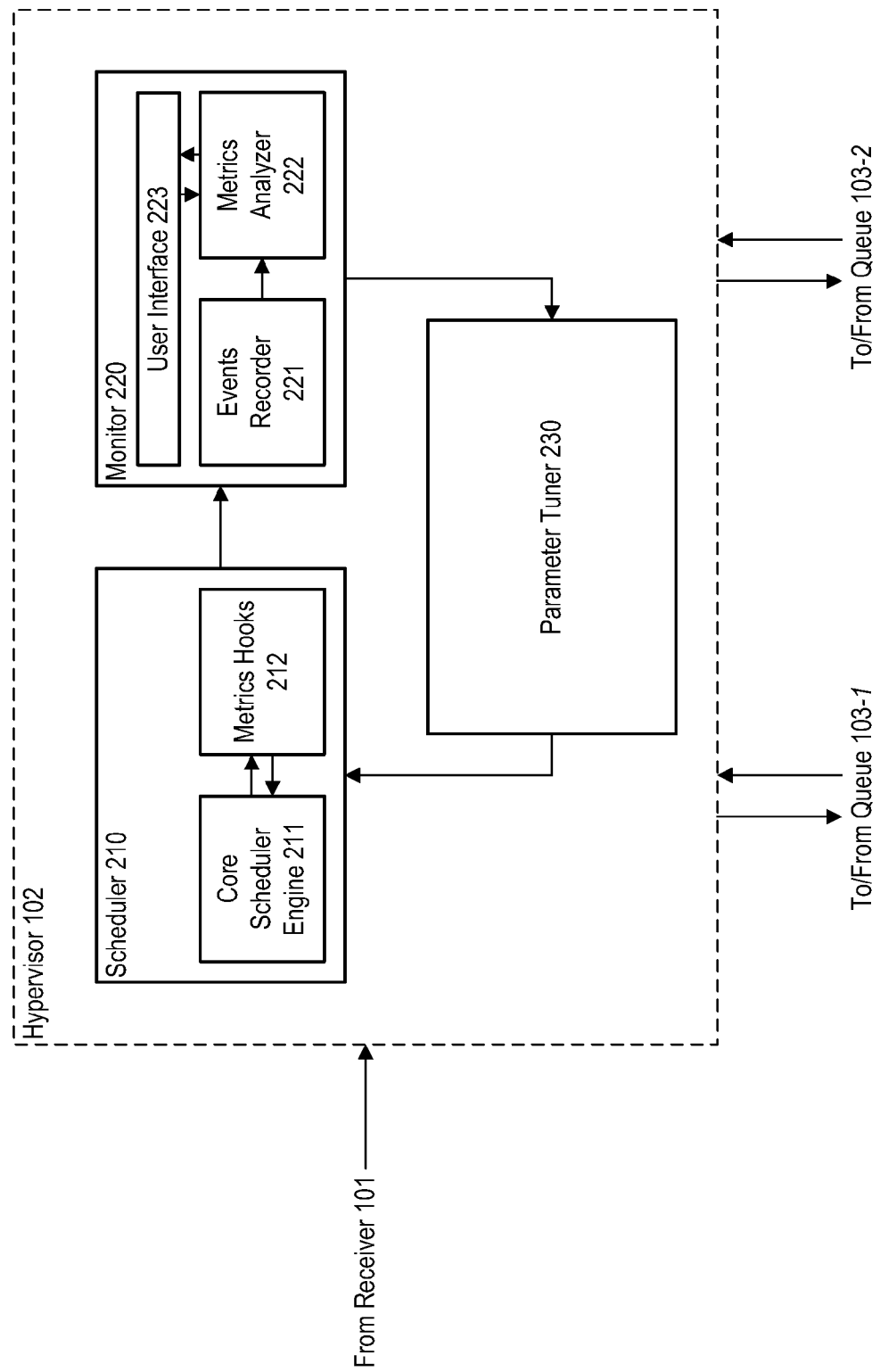
FIG. 2 depicts the salient elements of hypervisor 102 in accordance with an illustrative embodiment.

In accordance with the illustrative embodiments, hypervisor 102 is an enhanced hypervisor that is based on a credit scheduling scheme, because it comprises a "credit" scheduler, which is depicted in more detail in FIG. 2. The XEN® hypervisor is an example of a hypervisor that comprises a credit scheduler. It will be clear to those skilled in the art, after reading this disclosure, how to make and use alternative embodiments of the present invention in which hypervisor 102 does not comprise a credit scheduler or a credit scheduling scheme. It will be clear to those skilled in the art, after reading this disclosure, how to make and use hypervisor 102.

Queue 103-1 is hardware that holds each task and its accompanying parameters, while the task awaits execution by processor 104-1.

Queue 103-2 is hardware that holds each task and its accompanying parameters, while the task awaits execution by processor 104-2. It will be clear to those skilled in the art, after reading this disclosure, how to make and use queues 103-1 and 103-2.

Processor 104-1 is hardware that is a processor that executes tasks in the order determined by hypervisor 102. In accordance with the illustrative embodiments of the present invention, processor 104-1 comprises one core, but it will be clear to those skilled in the art, after reading this disclosure, how to make and use alternative embodiments of the present invention in which processor 104-1 comprises multiple cores.

Processor 104-2 is hardware that executes tasks in the order determined by hypervisor 102. In the illustrative embodiments, processor 104-2 is a processor identical to processor 104-1, but it will be clear to those having ordinary skill in the art, after reading the present disclosure, how to make and use alternative embodiments in which processors 104-1 and 104-2 are not identical.

In the illustrative embodiments, processor 104-1 selects the task at the head of queue 103-1 to execute next. In the illustrative embodiments, processor 104-2 selects the task at the head of queue 103-2 to execute next. This is depicted in more detail in FIG. 3. It will be clear to those having ordinary skill in the art, after reading the present disclosure, how to make and use alternative embodiments in which a processor executes its next task from a source other than its corresponding queue; or from other than the head of the corresponding queue. It will be clear to those skilled in the art how to make and use processor 104-1 and processor 104-2.

Transmitter 105-1 is well-known hardware that transmits the results of each task execution from processor 104-1. Transmitter 105-2 is well-known hardware that transmits the results of each task execution from processor 104-2. It will be clear to those having ordinary skill in the art how to make and use transmitters 105-1 and 105-2.

FIG. 2 depicts the salient elements of hypervisor 102 in accordance with an illustrative embodiment.

Hypervisor 102 comprises in salient part: scheduler 210; monitor 220; and parameter tuner 230. Scheduler 210 comprises in salient part: core scheduler engine 211; and metrics hooks 212. Monitor 220 comprises in salient part: events recorder 221; metrics analyzer 222; and user interface 223.

It will be clear to those having ordinary skill in the art, after reading the present disclosure, how to make and use alternative embodiments in which monitor 220 or parameter tuner 230 or both or portions thereof reside(s) outside of hypervisor 102. For example, a separate application could comprise monitor 220 and parameter tuner 230 and could communicate with hypervisor 102 through appropriate interfaces, such as via an application programming interface ("API"). Likewise, metrics analyzer 222 could reside outside monitor 220 and outside hypervisor 210 as a separate application with appropriate interfaces, such as an API.

In some embodiments comprising an API interface, scheduler 210 collects natively available trace data and transmits them to the separate application via the API. Additionally, the separate application supplies adjustments to hypervisor 102 via the same API. Scheduler 210 receives the adjustments and translates them into appropriate parameters that govern the operations of scheduler 210.

It will be clear to those having ordinary skill in the art, after reading the present disclosure, how to make and use alternative embodiments in which hypervisor 102 also comprises queues 103-1 and 103-2.

Scheduler 210 according to the illustrative embodiments is a "credit" scheduler. It will be clear to those skilled in the art, after reading this disclosure, how to make and use alternative embodiments of the present invention in which the scheduler is not a credit scheduler.

Core scheduler engine 211 represents the core of the virtual machine monitor scheduler functions in hypervisor 102, including, but not limited to, setting and applying of the principal native parameters of scheduler 210. For example, in accordance with the credit scheduler in the illustrative embodiment, the native parameters include, but are not limited to: weights, caps, credits, and pinning. The core scheduler engine sets and applies the credits and caps that are allocated to each of the guest domains. Credits are distributed periodically. For example, credits are tuned through weight settings, wherein legal weights range from 1 to 65535 and the default weight is 256. A weight is a proportional share of a processor allocated to a guest domain and a weight can be changed by user input. A cap represents the maximum processing time that a domain can use in a given execution cycle, even if excess processor capacity is available. According to the illustrative embodiments, core scheduler engine 211 manages the weights, credits, and caps, and the resultant queuing of tasks that are to be executed on the available processors of data-processing system 100.

Additionally, core scheduler engine 211 is capable of setting a "processor pinning" policy, meaning that tasks associated with a given domain can be scheduled to be executed exclusively on a given processor, i.e., the domain is "pinned" to the selected processor. Typically, the other domains are pinned away from the selected processor, but in some illustrative embodiments other domains may be permitted to run on the selected processor.

On a task-by-task basis, core scheduler engine 211 is responsible for evaluating each task from receiver 101 and placing the task into an appropriate queue to await processing by the corresponding processor. The actions performed task-by-task by core scheduler engine 211 are described in more detail below and in the accompanying figures.

Metrics hooks 212 captures trace data from core scheduler engine 211. Examples of trace data include, but are not limited to, hypervisor calls, domain interactions, debugging features, and default events. Metrics hooks 212 further enables submitting changes to the parameters in core scheduler engine 211.

Events recorder 221 receives from scheduler 210 event notifications and associated information, including parameters, that are associated with a task; records the received information; and provides the information to metrics analyzer 222.

Metrics analyzer 222 processes and evaluates a plurality of metrics that are collected and recorded, and additionally calculates other metrics that are relevant to the present invention. These metrics are described in more detail below and in the accompanying figures.

User interface 223 provides at least one interface to users of hypervisor 102 in a manner well known in the art. User interface 223 enables users to view results from the metrics analyzer and to submit modifications to tune the parameters of scheduler 210. For example, a user can change the weight allocated to a given domain. In some embodiments, user interface 223 is provided via an API to a separate application.

Parameter tuner 230 calculates modified parameters for scheduler 210 so that the performance of scheduler 210 can be tuned to improve the performance of one or more domains running in data-processing system 100. Parameter tuner 230 transmits the modified parameters to scheduler 210. The parameters and resulting adjustments are described in more detail below and in the accompanying figures.

In the aggregate, hypervisor 102 depicted in FIG. 2 is an enhanced hypervisor that receives tasks to be executed, analyzes them, applies the currently governing parameters of scheduler 210, and places each task in a queue to await execution by a corresponding processor. Furthermore, by way of monitor 220 and parameter tuner 230, hypervisor 102 analyzes the on-going performance of data-processing system 100 and of the domains that run on it. Based on the performance metrics that are disclosed herein, at least some of the governing parameters of scheduler 210 are adjusted. Adjustments are typically performed cyclically, wherein the performance metrics of an execution cycle are analyzed and, if need be, adjustments are applied in a later execution cycle.

Figure 3:
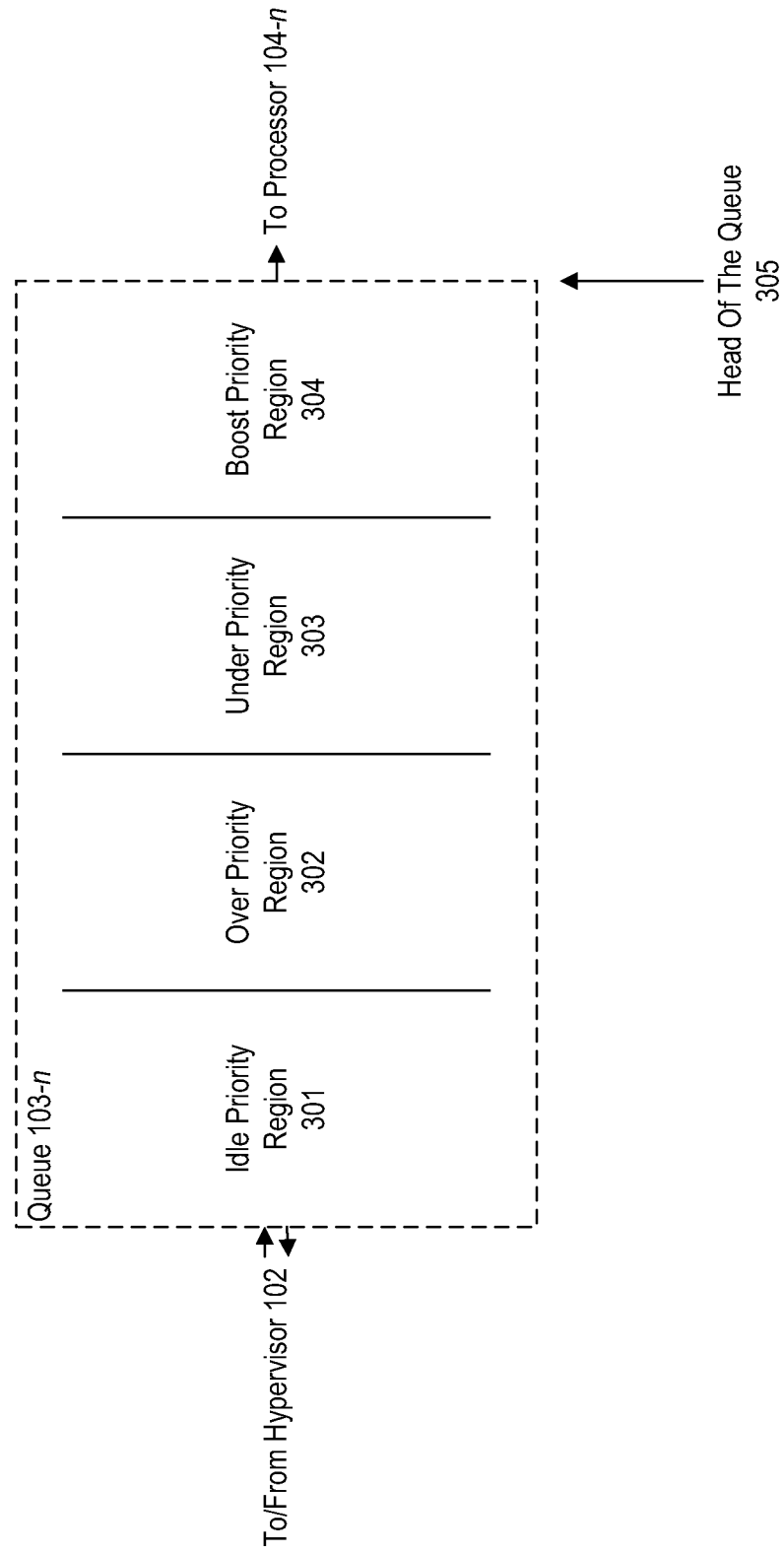
FIG. 3 depicts the salient aspects of queue 103-n.

FIG. 3 depicts the salient aspects of queue 103-$n$. Queue 103-$n$ comprises: idle priority region 301; over priority region 302; under priority region 303; boost priority region 304; and the head of the queue 305.

In prior art hypervisors, tasks have or are assigned a priority attribute that governs at least in part where the task is placed within a queue. Typically, prior art credit schedulers queue an incoming task or some other scheduler-related event at the end of the list of tasks that have the same priority, because credit scheduler queues have a region in the queue for each priority level. The priority levels and their relative meanings are specific to the scheduler platform being used by the implementers. For the XEN credit scheduler, for example, tasks have "boost priority," "under priority," "over priority," or "idle priority" in decreasing priority value. Thus, a task with "boost priority" is of a higher priority than a task with "under priority." Each of these priority levels has its own region within the queue that the XEN credit scheduler manages. In the preferred embodiments of the present invention, task priority levels are the same as in the XEN credit scheduler. Queuing of incoming tasks to the appropriate priority region of the queue is generally the same in the preferred embodiments as in the XEN credit scheduler, except as disclosed otherwise herein.

A task that is waiting an input/output ("I/O") event is considered to be idle while it awaits the event. Such a task is placed by hypervisor 102 in idle priority region 301. Such a task is not executed until it receives the expected event. Thus, a processor does not select tasks from this region of the queue, as it does from the other regions described below.

A task that has over-used its credit allocation when it executed on a processor during the previous execution cycle is placed by hypervisor 102 in over priority region 302. Such a task took longer to execute than its proportionally allotted credit.

A task that has under-used its credit allocation when it executed on a processor during the previous execution cycle is placed by hypervisor 102 in under priority region 303. Such a task took less time to execute than its proportionally allotted credit.

A task that receives an I/O event is placed in boost priority region 304 under certain conditions. Generally, that is because a task that previously awaited an external event, such as the arrival of a packet, should be executed quickly once the packet arrives. Thus, a task in idle priority region 301 is "boosted" to boost priority region 304 and therefore comes up for execution sooner than tasks in the under and over regions.

It should be noted that in the default XEN scheduler, only tasks that were in the idle priority region are boosted upon receiving an event. However, enhanced hypervisor 102 also boosts other tasks to the boost priority region, based on conditions, even if such tasks were in the under priority region 303 or in the over priority region 302 when receiving an event. This policy is referred to herein as "boost with event" and generally applies to time-sensitive tasks. This is, at least in part, because time-sensitive domains such as voice processing applications tend to be I/O intensive. The boost priority enhances the probability that time-sensitive tasks will be rapidly executed regardless of their "credit history." The "boost with event" policy is described in more detail below in regards to step 706.

It is to be understood that, depending upon the conditions of data-processing system 100 and the domains executing on it, any or all of regions 301-304 can be empty of resident tasks at any point in time. Furthermore, any number of tasks can reside in each and every one of regions 301-304.

The head of the queue 305 is where processor 104-$n$ selects the next task to execute, according to the illustrative embodiment. It will be clear to those having ordinary skill in the art, after reading the present disclosure, how to make and use alternative embodiments in which processor 104-$n$ selects a task to execute from other than the head of the queue 305.

Figure 4:
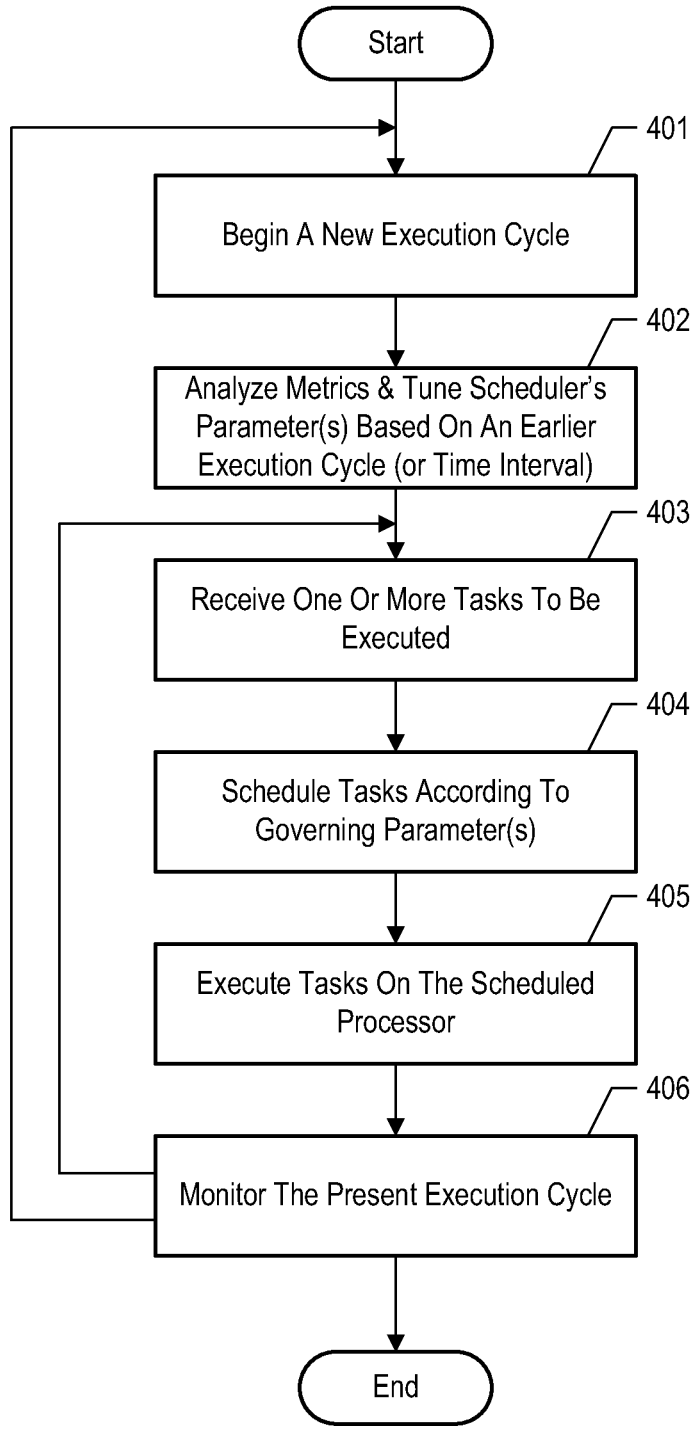
FIG. 4 depicts a flowchart of the salient steps performed by data-processing system 100 in accordance with an illustrative embodiment of the present invention.

FIG. 4 depicts a flowchart of the salient steps performed by data-processing system 100 in accordance with an illustrative embodiment of the present invention.

At step 401, data-processing system 100 begins a new execution cycle.

At step 402, hypervisor 102 analyzes metrics, and, if appropriate, tunes (or adjusts) the parameters that are to govern scheduler 210 during the present execution cycle. Step 402 and the conditions under which adjustments are made, if at all, are described in more detail below and in the accompanying figures.

In the illustrative embodiment, the adjustments are based, at least in part, on performance metrics from an earlier execution cycle, but it will be clear to those having ordinary skill in the art, after reading the present disclosure, how to make and use alternative embodiments that rely on other conditions, such as time of day, day of year, other parameters, etc. It will be further clear that in some alternative embodiments, the disclosed metrics are based on a time interval that does not equate to an execution cycle, such as a plurality of execution cycles, or some other time interval.

At step 403, receiver 101 receives one or more tasks to be executed by data-processing system 100 and presents each task to hypervisor 102.

At step 404, scheduler 210 in hypervisor 102 schedules each task according to the governing parameters established in step 402, by placing the task in an appropriate queue to be executed by the corresponding processor.

At step 405, a processor 104-$n$ to which the task is scheduled selects the task from the corresponding queue 103-$n$ and executes the task, and transmits the results to corresponding transmitter 105-$n$.

At step 406, hypervisor 102 monitors the performance of the present execution cycle so that it can generate performance metrics for subsequent use. So long as tasks remain to be executed, control passes from step 406 to step 403. Furthermore, so long as a new execution cycle is to begin, control passes from step 406 to step 401. Step 406 is described in more detail below and in the accompanying figures.

It will be clear to those having ordinary skill in the art, after reading the present disclosure, how to make and use the tasks associated with data-processing system 100. It will be clear to those having ordinary skill in the art, after reading the present disclosure, how to make and use alternative embodiments of the present invention in which steps 401-406 and their constituent steps are executed in a different sequence, are subdivided into other steps, are selectively skipped, are executed with different timing, or are differently grouped; or are executed by a different component or sub-component of data-processing system 100; or use different data structures than described herein.

Figure 5:
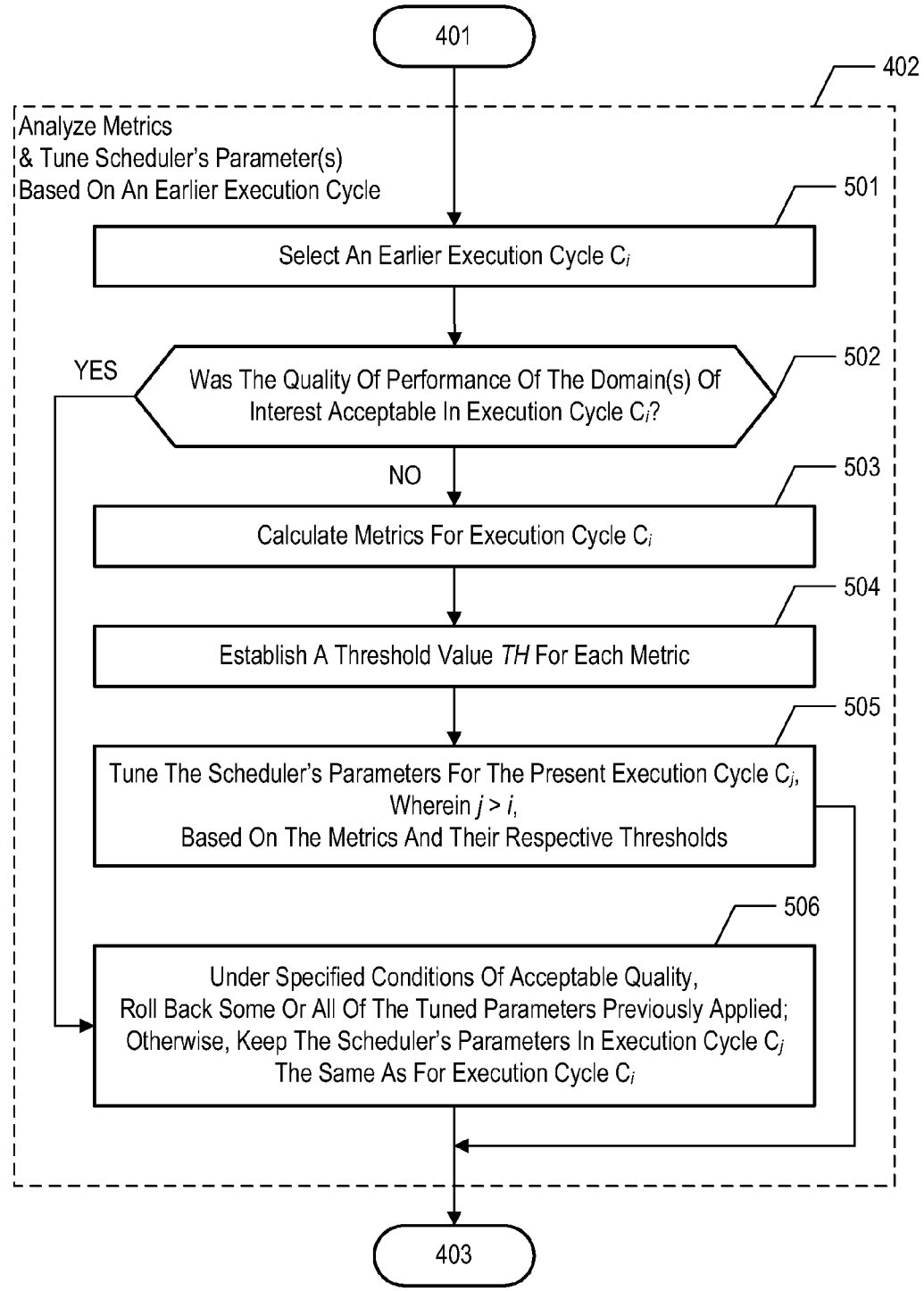
FIG. 5 depicts a flowchart of the salient steps associated with the performance of step 402.

FIG. 5 depicts a flowchart of the salient steps associated with the performance of step 402. Step 402 analyzes metrics and tunes the parameters of scheduler 210 based on the performance of an earlier execution cycle. In some embodiments, the basis is a combination of more than one earlier execution cycle.

At step 501, enhanced hypervisor 102 selects an earlier execution cycle, designated herein as $C_i$, wherein i is an integer. It is to be understood that execution cycle $C_i$ need not be the execution cycle that immediately precedes the present execution cycle, designated herein as $C_j$, wherein j is an integer and j>i.

At step 502, a decision point determines whether, during execution cycle $C_i$, the quality of performance of one or more domains of interest was acceptable. In the illustrative embodiments, the domain of interest is a media call processing application that is responsible for processing incoming media streams and playing them as they arrive and transcoding at least some of them for retransmission. Media streams can originate from any "live" source, such as an Internet protocol phone, a media server, audio from a radio station, a video camera feed, etc. In the illustrative embodiments, the quality of performance of this domain for purposes of step 502 is defined to be the perceived voice quality. In the illustrative embodiment, the voice quality is measured by the perceptual evaluation of speech quality ("PESQ") standard measure as specified by the ITU-T in *ITU-T Recommendation P.862*. In general, PESQ is based on comparing the original waveform from the caller against the final one received by the callee, ranging in value from 0 (bad quality) to 4.5 (best quality). A PESQ value of 4 and above is generally considered to be good voice quality.

When the quality of performance is deemed acceptable, control passes to step 506. For example, a PESQ value of 4 or above for at least 90% of the tasks in the domain of interest could be considered to be acceptable performance. Average task response time below a certain threshold may also be considered to be acceptable performance. It will be clear to those having ordinary skill in the art, after reading the present disclosure, how to make and use alternative embodiments in which the domain(s) of interest is of another type; or that use other metrics of performance quality or combinations of metrics in step 502; or that use another level of acceptability.

When the quality of performance is deemed unacceptable, control passes to step 503.

At step 503, hypervisor 102 calculates a plurality of metrics for the earlier execution cycle $C_i$. The metrics and step 503 are described in more detail below and in the accompanying figures.

At step 504, hypervisor 102 establishes a threshold value TH that is associated with each of the metrics calculated at step 503. The threshold is established based on the characteristics of the domains that run in data-processing system 100. In the preferred embodiments, the relevant thresholds are developed through averaging past results from a configuration when the domain of interest runs by itself with acceptable quality of performance, e.g., voice quality. The threshold value TH that is associated with each metric is then set to be 15% higher or lower (depending on the type of metric) from the prior-run average, which represents an idealized model. It will be clear to those having ordinary skill in the art, after reading the present disclosure, how to make and use alternative embodiments that determine thresholds in a different manner, such as by trial and error; by a figure other than 15%; or by other heuristics.

At step 505, hypervisor 102 tunes the parameters of scheduler 210 for use in the present execution cycle $C_j$, wherein j>i, based on the values of relevant metrics and their respective thresholds. Step 505 is described in more detail below and in the accompanying figures.

At step 506, under specified conditions of acceptable quality of performance in execution cycle $C_i$, hypervisor 102 rolls back some or even all of the parameters of scheduler 102 that were previously tuned. The specified conditions are at the discretion of the implementers of data-processing system 100. For example, when traffic from a domain of interest has dropped significantly, e.g., voice traffic has dwindled, the tuned parameters may no longer be necessary to achieve acceptable quality of performance. For example, a system administrator may be observing other changed conditions that warrant a roll back. It is to be understood that acceptable quality of performance as determined in step 502 does not force a roll back of tuned parameters, unless specified conditions of step 506 are satisfied. When the specified conditions of acceptable quality are not satisfied, hypervisor 102 does not modify the parameters and settings that were utilized by scheduler 210 in the earlier execution cycle $C_i$, and retains those same parameters and settings for the present execution cycle $C_j$.

Figure 6:
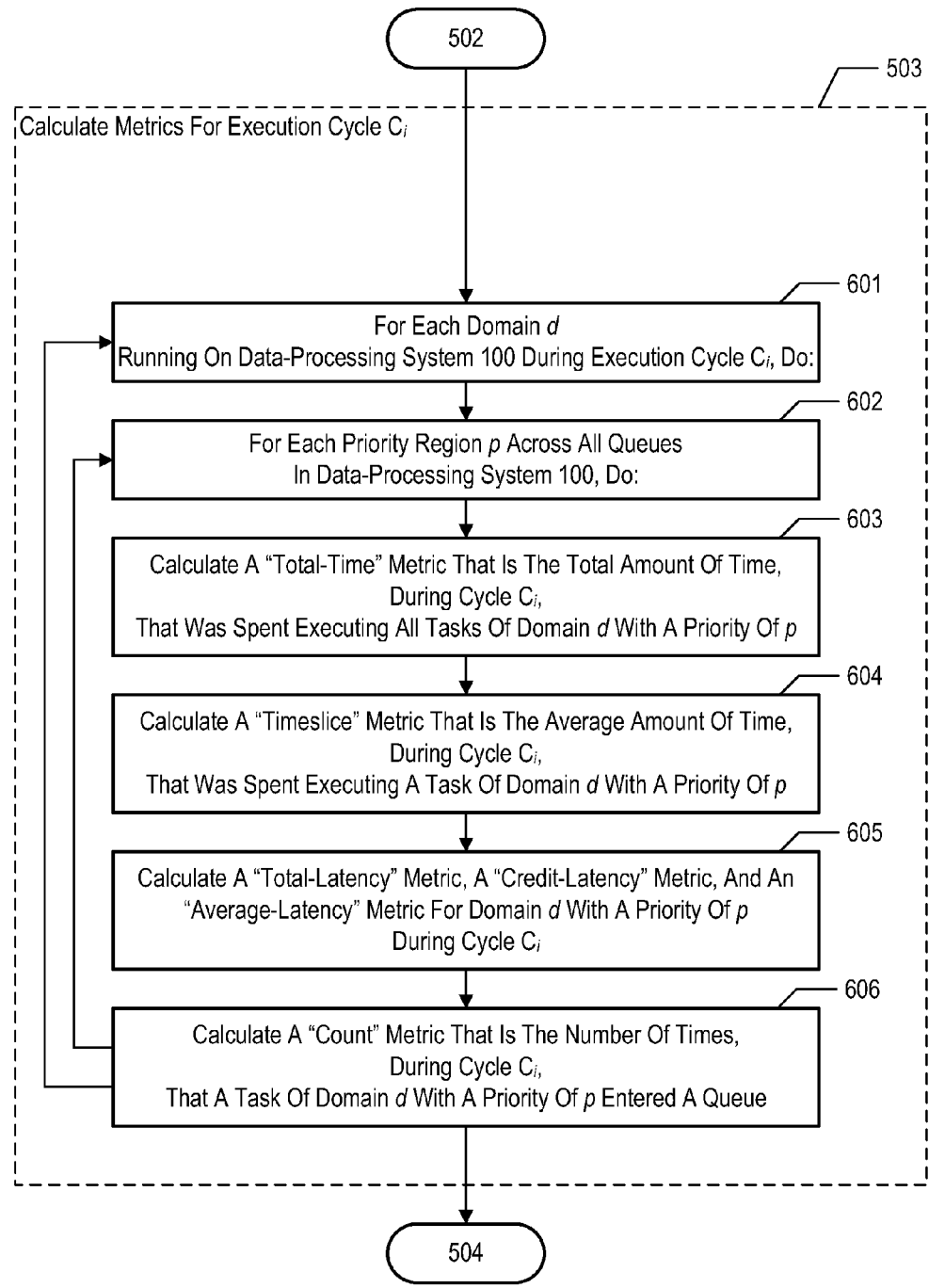
FIG. 6 depicts a flowchart of the salient steps associated with the performance of step 503.

FIG. 6 depicts a flowchart of the salient steps associated with the performance of step 503. Collectively, at step 503, hypervisor 102 calculates a plurality of metrics for an earlier execution cycle $C_i$.

At step 601, a per-domain "do-loop" begins for each domain d running on data-processing system 100 during execution cycle $C_i$.

At step 602, a nested per-priority do-loop begins for each priority region p across all queues in data-processing system 100 during execution cycle $C_i$. Thus, in regards to a priority p for a given domain d, the relevant metrics are cumulative across all the queues 103-n in data-processing system 100.

At step 603, hypervisor 102 calculates a "total-time" metric that is the total amount of time, during execution cycle $C_i$, that was spent executing all tasks of domain d with a priority p.

At step 604, hypervisor 102 calculates a "timeslice" metric that is the average amount of time, during execution cycle $C_i$, that was spent executing a task of domain d with a priority p. This metric is calculated across all processors 104-n in data-processing system 100.

At step 605, hypervisor 102 calculates a number of latency metrics for tasks of domain d with priority p during execution cycle $C_i$, which are calculated across all processors 104-n in data-processing system 100. A "total-latency" metric is the total amount of time, during execution cycle $C_i$, that a task of domain d with a priority p waited in queue 103-n before being executed on a processor. A "credit-latency" metric is the average amount of time, during execution cycle $C_i$, that a task of domain d with a priority p waited in queue 103-n before being allocated more credit by scheduler 210. An "average-latency" metric is the average amount of time, during execution cycle $C_i$, that a task of domain d with a priority p waited in queue 103-n before being executed on a processor.

At step 606, hypervisor 102 calculates a "count" metric that is the number of times, during cycle $C_i$, that a task of domain d with a priority p entered queue 103-n. After step 606 is executed, the per-priority nested do-loop continues with step 602; when this do-loop is exhausted, the per-domain do-loop continues with step 601; when this do-loop is exhausted, control passes to step 504.

As noted earlier, it will be clear to those having ordinary skill in the art how to make and use alternative embodiments in which hypervisor 102 is not generating the metrics calculations, and in which the metrics are calculated outside of hypervisor 102. It will be clear to those having ordinary skill in the art, after reading the present disclosure, how to make and use alternative embodiments that calculate a subset of these metrics, or other metrics that are consistent with the characteristics of the domain(s) of interest.

Figure 7:
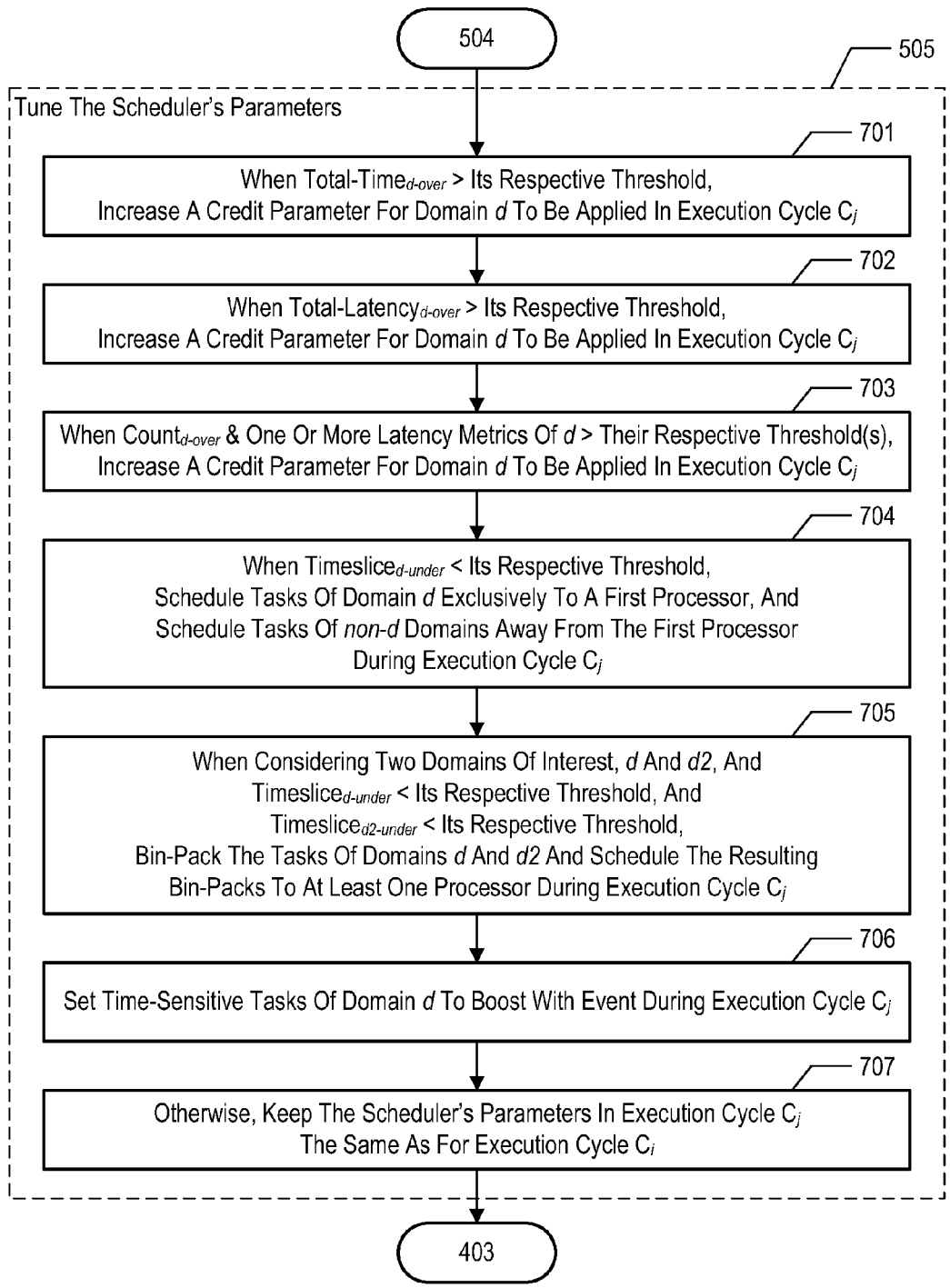
FIG. 7 depicts a flowchart of the salient steps associated with the performance of step 505.

FIG. 7 depicts a flowchart of the salient steps associated with the performance of step 505. In general, step 505 tunes the parameters of scheduler 210 based on the metrics calculated for the earlier execution cycle $C_i$ that was selected at step 501.

Total-Time.

At step 701, the total-time metric of over-priority tasks of the domain of interest d, designated Total-Time$_{d\text{-}over}$, is compared to its corresponding threshold. When the value of the metric exceeds its corresponding threshold value, the credit parameter associated with domain d is adjusted for the present execution cycle, $C_j$. The credit allocated to domain d is increased, meaning that domain d will get a larger share of execution time.

The reason for this adjustment is that the relatively high value of the total-time metric for over-priority tasks of domain d means that too many of domain d's tasks entered a queue with over-priority, i.e., having over-spent their allocated credits. To alleviate the over-spending, more credits are allocated to domain d in the present execution cycle $C_j$.

Latency.

At step 702, the total latency metric of over-priority tasks of the domain of interest d, designated Total-Latency$_{d\text{-}over}$, is compared to its corresponding threshold. When the value of the metric exceeds its corresponding threshold value, the credit parameter associated with domain d is adjusted for the present execution cycle, $C_j$. The credit allocated to domain d is increased, meaning that domain d will get a larger share of execution time.

The reason for this adjustment is that the relatively high value of the latency metric for over-priority tasks of domain d means that, altogether, domain d's tasks waited too long in the over-priority region of a queue, i.e., after having over-spent their allocated credits. To alleviate the over-spending and too-long wait time, more credits are allocated to domain d in the present execution cycle $C_j$. It will be clear to those having ordinary skill in the art, after reading the present disclosure, how to make and use alternative embodiments in which one of the other latency metrics is applied here, e.g., Credit-Latency$_{d\text{-}over}$ or Average-Latency$_{d\text{-}over}$ or a combination of latency metrics.

At step 703, a combination of Count$_{d\text{-}over}$ and one or more of the disclosed latency over-priority metrics, i.e., Total-Latency$_{d\text{-}over}$, Credit-Latency$_{d\text{-}over}$, and Average-Latency$_{d\text{-}over}$, are considered and compared to their respective thresholds. When one or more thresholds are exceeded, the credit parameter associated with domain d is adjusted for the present execution cycle, $C_j$. The credit allocated to domain d is increased, meaning that domain d will get a larger share of execution time. The combination of metrics to be considered in this step is at the discretion of the implementers of data-processing system 100. It will be clear to those having ordinary skill in the art, after reading the present disclosure, how to make and use alternative embodiments in which other additional metrics are brought to bear at this point to determine whether and by how much to increase the credit parameter associated with domain d.

Pinning.

At step 704, the timeslice metric of under-priority tasks of the domain of interest d, designated Timeslice$_{d\text{-}under}$, is compared to its corresponding threshold. When the value of the metric is below its corresponding threshold value, processor pinning is established for domain d in the present execution cycle $C_j$. In the preferred embodiments, processor pinning means that (i) the tasks of domain d are scheduled exclusively to a first processor 104-n, and (ii) the tasks of the non-d domains are scheduled to other processor(s) of data-processing system 100, i.e., away from the first processor. It should be noted that pinning is generally not a default setting in prior art credit schedulers, because it is not work-conserving, i.e., pinning may leave the processor under-utilized. However, pinning is desirable for assuring sufficient processor resources for the domain of interest d.

The reason for pinning under the conditions of step 704 is that the relatively low value of the timeslice metric for under-priority tasks of domain d means that, on average, domain d's tasks spent too short a time being executed on a processor even though they under-spent their credits, probably because they were pre-empted by other tasks, such as boost priority tasks possibly from a non-d domain. To give domain d's tasks sufficient processing time, domain d is pinned to a first processor. To assure exclusivity to domain d, tasks from non-d domains are scheduled to other processors, but not to the first processor.

It will be clear to those having ordinary skill in the art, after reading the present disclosure, how to make and use alternative embodiments with a non-exclusive pinning policy, in which some tasks of non-d domains are scheduled to the first processor even when all tasks of domain d are scheduled to the first processor. In some embodiments, non-exclusive pinning is achieved through bin-packing, as shown at step 705.

Load-Balancing with Bin-Packing.

At step 705, when there is more than one domain of interest to consider that might benefit from pinning, bin-packing is employed. The illustrative domains under consideration are d and d2. The timeslice metric of under-priority tasks of domain d, designated Timeslice-hd d-under, is compared to its corresponding threshold. The timeslice metric of under-priority tasks of domain d2, designated Timeslice$_{d2\text{-}under}$, is compared to its corresponding threshold. When both metrics are below their respective thresholds, both domains would benefit from some form of pinning. However, in the illustrative embodiment, exclusive pinning of both domains would leave no processors available for any other domains in the system. Therefore, non-exclusive pinning is applied. Bin-packing enables some load balancing among the available processors to prevent non-exclusive pinning from over-using one processor.

For each of the tasks of domains d and d2, arriving at hypervisor 102 in temporal order, $T_1 \ldots T_k$, hypervisor 102 determines a runtime parameter $\rho_k$ that is associated with task $T_k$. In the illustrative embodiment, $\rho_k$ accompanies each task $T_k$ when it arrives, but it will be clear to those skilled in the art, after reading the present disclosure, how to make and use alternative embodiments in another manner of the implementers' choosing. For example, $\rho_k$ can be calculated upon the arrival of each task, or $\rho_k$ can be re-calculated based on other considerations.

Hypervisor 102 then bin-packs the tasks of domains d and d2. Bin-packing techniques are well-known in the art. In regards to the particular problem of multi-processor scheduling, one way of phrasing the multi-processor scheduling problem in terms of bin-packing concepts is: "'Given a set J of jobs where job $j_i$ has length $l_i$ and a number of processors $m_i$, what is the minimum possible time required to schedule all jobs in J on m processors such that none overlap?'" In some illustrative embodiments, the bin-packing is directed at minimizing the difference in expected utilization among processors for executing the tasks of domains d and d2, i.e., load-balancing the processing of these domains. Thus, the bin-packing in accordance with some illustrative embodiments aims to equalize the percentage of time in an execution cycle that each processor in data-processing system 100 is to spend executing domains d and d2. For purposes of this disclosure, the percentage of time in an execution cycle that a processor, m, is to spend executing time-sensitive tasks in an execution cycle is defined as "$\mu_m$" wherein m is an integer. Accordingly, in some embodiments based on a data-processing system 100 comprising two processors, i.e., processor 104-1 and processor 104-2, the bin-packing in step 705 is directed at creating at least one bin-pack for each of the two processors. Thus, in some embodiments, $\mu_1$ for processor 104-1 is the sum of the runtime parameters $\rho$ of the tasks in a first bin-pack, taken as a percentage of the total processing capacity of processor 104-1. Likewise, in some embodiments, $\mu_2$ for processor 104-2 is the sum of the runtime parameters $\rho$ of the tasks in a second bin-pack, taken as a percentage of the total processing capacity of processor 104-2.

It will be clear to those having ordinary skill in the art, after reading the present disclosure, how to make and use alternative embodiments in which the bin-packing in step 705 is based on other considerations, such as minimizing the number of processors in data-processing system 100 that are to be used for processing time-sensitive tasks, or minimizing the expected execution time of the tasks in each bin-pack, or a combination of considerations, or other considerations. For example, when the objective is to minimize the number of processors allocated to bin-packed tasks, one way of stating the problem is that "objects of different volumes must be packed into a finite number of bins of capacity V in a way that minimizes the number of bins used." Accordingly, in some embodiments based on a data-processing system 100 comprising two processors, i.e., processor 104-1 and processor 104-2, the bin-packing is directed at bin-packing as many domains as need non-exclusive pinning, such that at most m, but as few as possible, processors receive bin-packed tasks to execute. It will be clear to those having ordinary skill in the art how to implement bin-packing in data-processing system 100 in accordance with the bin-packing optimization objectives sought to be achieved.

It will be clear to those having ordinary skill in the art, after reading the present disclosure, how to make and use alternative embodiments in which tasks are grouped together other than by bin-packing.

Boost with Event.

At step 706, the "boost with event" policy is executed, meaning that a queued task that receives an I/O event is immediately moved to the boost region of a queue, regardless of what region the task occupied when it received the I/O event. It should be noted that prior art credit schedulers do not boost tasks that are outside the idle priority region 301. By contrast to the prior art, the enhanced hypervisor 102 according to the illustrative embodiments, applies "boost with event" to tasks in under priority region 303. In other embodiments, enhanced hypervisor 102 also applies "boost with event" to tasks in over priority region 302. In other embodiments, enhanced hypervisor 102 applies "boost with event" to tasks in over priority region 302 but not to tasks in under priority region 303.

"Boost with event" is applied in the illustrative embodiments to time-sensitive tasks and to tasks from a domain that is designated as time-sensitive, but the invention is not so limited. The rationale of the "boost with event" policy is that time-sensitive domains such as voice processing applications tend to be I/O intensive. The boost priority increases the probability that time-sensitive tasks will be rapidly executed regardless of their "credit history." Thus the "boost with event" policy as implemented in the enhanced hypervisor 102 seeks to decrease the average latency of the boosted tasks.

In some illustrative embodiments, the timeslice metric for boost-priority tasks of the domain of interest d, designated $Timeslice_{d\text{-}boost}$, is compared to its corresponding threshold. When the value of the metric is below its corresponding threshold value, the "boost with event" policy is established for execution cycle $C_j$. It will be clear to those having ordinary skill in the art, after reading the present disclosure, how to make and use alternative embodiments that apply "boost with event" to time-sensitive tasks regardless of the value of $Timeslice_{d\text{-}boost}$. In such embodiments, "boost with event" does not require the calculation of $Timeslice_{d\text{-}boost}$ and accordingly conserves some computing resources.

It will be clear to those having ordinary skill in the art, after reading the present disclosure, how to make and use alternative embodiments in which the credits are allocated indirectly by adjusting the weight associated with domain d. In general, in alternative embodiments wherein parameter tuner 230 resides outside hypervisor 102, the credit adjustments are achieved through weight adjustments submitted by parameter tuner 230 to scheduler 210, which translates the weight(s) into the appropriate adjustments to the credit allocations. For example, a privileged domain running in data-processing system 100, designated "Dom0," could transmit the weight adjustments to scheduler 210. Likewise in regards to the pinning and "boost with event" policies: when parameter tuner 230 resides outside hypervisor 102, the policy modifications according to the present invention are transmitted to scheduler 210 indirectly, such as by the privileged domain Dom0, and are translated by scheduler 210 into appropriate local parameters and settings.

No Adjustments.

At step 707, absent the conditions set forth in steps 701-706, hypervisor 102 does not modify the parameters and settings that were utilized by scheduler 210 in the earlier execution cycle $C_i$, and retains those same parameters and settings for the present execution cycle $C_j$.

It will be clear to those having ordinary skills in the art, after reading the current disclosure, how to make and use alternative embodiments in which the metrics disclosed herein are differently defined and calculated, based on other considerations that are relevant to the domains of interest to the implementers. For example, a timeslice calculation could be based on a running average over an extended time interval, rather than a single execution cycle.

Figure 8:
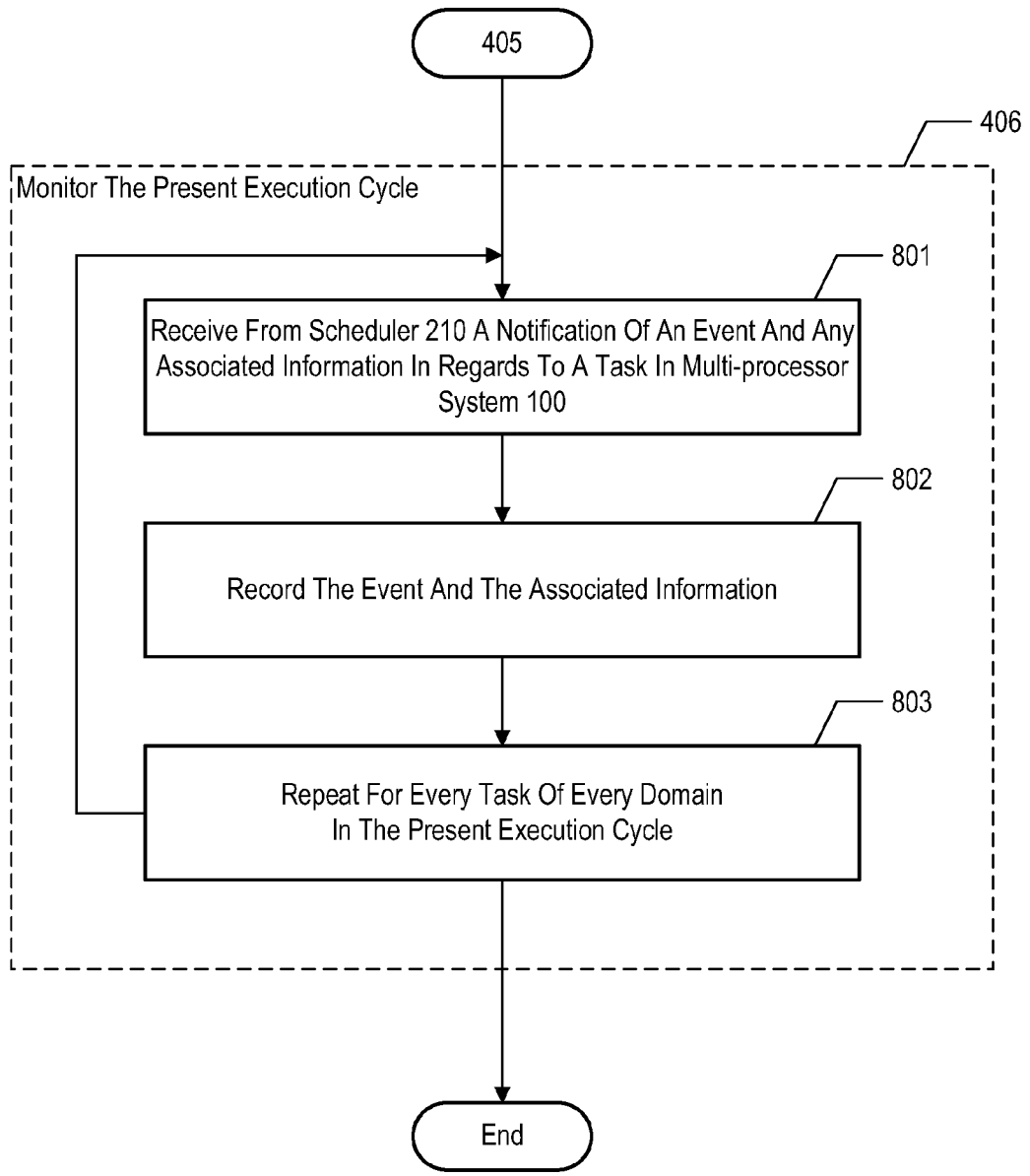
FIG. 8 depicts a flowchart of the salient steps associated with the performance of step 406.

FIG. 8 depicts a flowchart of the salient steps associated with the performance of step 406. In general, step 406 monitors the present execution cycle and collects the data to be analyzed at step 402 in subsequent execution cycles. For example, the performance of step 406 in an earlier execution cycle $C_i$ enables the analysis and tuning described above in regards to a later execution cycle $C_j$, wherein j>i.

At step 801, monitor 220 receives from scheduler 210 a notification of an event that occurred in data-processing system 100. The event notification is accompanied by relevant parameters associated with the event. For example, every time a task enters a queue, an event is reported by scheduler 210 to monitor 220. The event information is accompanied by attributes such as the domain that comprises the task, the priority region where the task was placed, the time that the task entered the queue, etc. For example, when a task is executed, an event is reported to monitor 220. The event information is accompanied by attributes such as the domain that comprises the task, the processor identifier, the priority region from which the task was selected for execution, the duration of execution, etc.

At step 802, monitor 220 records each event and the associated information, via events recorder 221. The recorded data is available for data analysis at metrics analyzer 222, and can be made available to users via user interface 223.

At step 803, the monitoring steps described above are repeated for every task of every domain throughout the present execution cycle.

Some illustrative embodiments comprise a media server running on a credit-scheduler-based platform that hosts a virtualized enterprise Internet Protocol telephony system with multiple virtual machines, including virtual machines performing call signaling, media processing and CPU-intensive tasks. Such applications are highly I/O intensive and, at the same time, they also need CPU cycles to process media packets. An exemplary media server operates with a traffic load of 4 calls per second using the well-known G.711 codec with a call hold time of 30 seconds for a maximum of 240 streams (120 callers and 120 callees) incoming into the media server. The voice quality is measured by PESQ. When the exemplary media server operates with a sampling rate of 1 in 4 calls, significant performance benefits were observed using the techniques of the present invention. In particular, from a situation when more than 50% of the media streams had poor PESQ quality operating on a prior art system, the methods according to the present invention resulted in a situation where almost no sampled media stream had a PESQ below 4.0.

It is to be understood that the disclosure teaches just some examples of the illustrative embodiments and that many variations of the invention can easily be devised by those skilled in the art after reading this disclosure and that the scope of the present invention is to be determined by the following claims.

What is claimed is:

1. A method comprising:
receiving by a hypervisor in a data-processing system a first metric that is associated with a first domain, wherein:
  (i) the data-processing system comprises a first processor and a second processor,
  (ii) the first domain comprises a first plurality of tasks that were executed on the data-processing system, and
  (iii) the first metric is based on the amount of time, during an earlier time interval,
that was spent executing tasks of the first domain that had an over priority;
when the value of the first metric is above a first threshold, increasing an amount of time to be spent in a later time interval to execute tasks of the first domain that have an over priority;
executing by the data-processing system in the later time interval the tasks of the first domain, based on the increased amount of time;
receiving, by the data-processing system, a second metric that is associated with the first domain, wherein the second metric is based on the amount of time, during the earlier time interval, that was spent executing tasks of the first domain that had an under priority;
receiving, by the data-processing system, a third metric that is associated with a second domain, wherein:
  (i) the second domain comprises a second plurality of tasks that were executed on the data-processing system, and
  (ii) the third metric is based on the amount of time, during the earlier time interval, that was spent executing tasks of the second domain that had an under priority;
when the value of the second metric is below a second threshold and the value of the third metric is below a third threshold, bin-packing by the hypervisor the first plurality of tasks and the second plurality of tasks into at least a first bin-pack, wherein the bin-packing is based on minimizing the number of processors that are to execute the first plurality of tasks and the second plurality of tasks; and
executing by the first processor the tasks in the first bin-pack,
wherein:
  characteristics determined by a priority level of a task comprise: (i) where the task is placed within a queue to await execution; and (ii) how soon after being queued the task will be executed by one of the first processor and the second processor;
  the queue comprises a boost-priority region; an under-priority region; an over-priority region; and an idle-priority region, in decreasing priority value;
  a task with the over priority comprises a task that is queued within the over-priority region of the queue;
  a task with an under priority comprises a task that is queued within the under-priority region of the queue.

2. The method of claim 1 wherein:
the increasing is further based on a fourth metric that is based on a measurement of total latency, during the earlier time interval, of tasks of the first domain that had an over priority.

3. The method of claim 1 further comprising:
receiving by the hypervisor a fourth metric that is based on the amount of time, during the earlier time interval, that was spent executing tasks of the first domain that had an under priority; and
when the value of the fourth metric is below a fourth threshold:
  (i) scheduling exclusively to the first processor the tasks of the first domain, to be executed in the later time interval, and
  (ii) scheduling the tasks of a second domain, to be executed in the later time interval, to a processor in the data-processing system that is exclusive of the first processor.

4. The method of claim 1 wherein the hypervisor comprises a credit-scheduler that performs the increasing.

5. The method of claim 1 wherein an application transmits at least one instruction to the hypervisor to perform the increasing, and wherein the application is separate from the hypervisor.

6. The method of claim 5 wherein the increasing is based on a weight that is generated by the application.

7. The method of claim 1 wherein the first domain is a time-sensitive domain.

8. The method of claim 1 wherein some of the first plurality of tasks are time-sensitive tasks.

9. The method of claim 1 further comprising:
when an event arrives that is associated with a task that is time-sensitive, assign a boost priority to the task, wherein the assigning is independent of the pre-existing priority of the task, and wherein the task is to be executed on the data-processing system in the later time interval in accordance with the boost priority.

10. A method comprising:
receiving, by a hypervisor in a data-processing system, a first metric that is associated with a first domain that is time-sensitive, wherein:
   (i) the data-processing system comprises a first processor and a second processor,
   (ii) the first domain comprises a first plurality of tasks having allocated credit that were executed on the data-processing system,
   (iii) the first metric is based on the amount of time, during an earlier time interval, that was spent executing tasks of the first domain that had an under priority, and
   (iv) the time-sensitive domain comprises tasks having an execution deadline; and
when the value of the first metric is below a first threshold, scheduling the tasks of the first domain exclusively to the first processor, to be executed in a later time interval; and
executing, in the later time interval, exclusively by the first processor, the tasks of the first domain,
wherein:
   characteristics determined by a priority level of a task comprise: (i) where the task is placed within a queue to await execution; and (ii) how soon after being queued the task will be executed by one of the first processor and the second processor;
   the queue comprises a boost-priority region; an under-priority region; an over-priority region; and an idle-priority region, in decreasing priority value;
   a task with the over priority comprises a task that overused its credit allocation during its previous execution cycle and is queued within the over-priority region of the queue;
   a task with an under priority comprises a task that underused its credit allocation during its previous execution cycle and is queued within the under-priority region of the queue;
   the scheduling of tasks of the first domain exclusively to the first processor is to prevent pre-emption of the tasks of the of the first domain that had an under priority by other tasks and to provide a predetermined sufficient processing time; and
   the first threshold is based upon a quality of performance of one or more tasks of the first plurality of tasks.

11. The method of claim 10 further comprising: when the value of the first metric is below a first threshold, scheduling the tasks of a second domain to a processor in the data-processing system that is exclusive of the first processor, to be executed in the later time interval.

12. The method of claim 10 wherein the hypervisor comprises a credit-scheduler that performs the increasing.

13. The method of claim 10 wherein some of the first plurality of tasks are time-sensitive tasks.

14. The method of claim 10 further comprising:
when an event arrives that is associated with a task that is time-sensitive, assign a boost priority to the task, wherein the assigning is independent of the pre-existing priority of the task, and wherein the task is to be executed on the data-processing system in the later time interval in accordance with the boost priority.

15. A method comprising:
receiving by a hypervisor in a data-processing system a first metric that is associated with a first domain, wherein:
   (i) the data-processing system comprises a first processor and a second processor,
   (ii) the first domain comprises a first plurality of tasks that were executed on the data-processing system, and
   (iii) the first metric is based on a measurement of total latency, during an earlier time interval, of tasks of the first domain that had an over priority;
when the value of the first metric is above a first threshold, increasing the amount of time to be spent in a later time interval to execute tasks of the first domain that have an over priority;
receiving, by the data-processing system, a second metric that is associated with the first domain, wherein the second metric is based on the amount of time, during the earlier time interval, that was spent executing tasks of the first domain that had an under priority;
receiving, by the data-processing system, a third metric that is associated with a second domain, wherein:
   (i) the second domain comprises a second plurality of tasks that were executed on the data-processing system, and
   (ii) the third metric is based on the amount of time, during the earlier time interval, that was spent executing tasks of the second domain that had an under priority;
when the value of the second metric is below a second threshold and the value of the third metric is below a third threshold, bin-packing by the hypervisor the first plurality of tasks and the second plurality of tasks into at least a first bin-pack, wherein the bin-packing is based on minimizing the number of processors that are to execute the first plurality of tasks and the second plurality of tasks; and
executing by the first processor the tasks in the first bin-pack,
wherein:
   characteristics determined by a priority level of a task comprise: (i) where the task is placed within a queue to await execution; and (ii) how soon after being queued the task will be executed by one of the first processor and the second processor;
   the queue comprises a boost-priority region; an under-priority region; an over-priority region; and an idle-priority region, in decreasing priority value;
   a task with the over priority comprises a task that is queued within the over-priority region of the queue;
   a task with an under priority comprises a task that is queued within the under-priority region of the queue.

16. The method of claim 15 further comprising:
receiving by the data-processing system a fourth metric that is based on the amount of time, during the earlier time interval, that was spent executing tasks of the first domain that had an under priority; and
when the value of the fourth metric is below a fourth threshold:

(i) scheduling exclusively to the first processor the tasks of the first domain, to be executed in the later time interval, and
(ii) scheduling the tasks of a second domain, to be executed in the later time interval, to a processor in the data-processing system that is exclusive of the first processor.

17. The method of claim 15 wherein the hypervisor comprises a credit-scheduler that performs the increasing.

18. The method of claim 15 wherein an application transmits at least one instruction to the hypervisor to perform the increasing, and wherein the application is separate from the hypervisor, and wherein the increasing is based on a weight that is generated by the application.

19. The method of claim 15 wherein the first domain is a time-sensitive domain.

20. The method of claim 15 wherein some of the first plurality of tasks are time-sensitive tasks.

21. The method of claim 15 further comprising:
when an event arrives that is associated with a task that is time-sensitive, assign a boost priority to the task, wherein the assigning is independent of the pre-existing priority of the task, and wherein the task is to be executed on the data-processing system in the later time interval in accordance with the boost priority.

* * * * *